US010631550B2

(12) United States Patent
Dunnewind et al.

(10) Patent No.: US 10,631,550 B2
(45) Date of Patent: Apr. 28, 2020

(54) METHOD OF EXTRUDING SAUSAGE SLEEVES OF AT LEAST PARTIAL COLLAGEN, EXTRUSION HEAD AND EXTRUDED COLLAGEN SLEEVES

(71) Applicant: MAREL TOWNSEND FURTHER PROCESSING B.V., Boxmeer (NL)

(72) Inventors: Albertus Dunnewind, Wageningen (NL); Patricia Rosa Maria Hoekstra-Suurs, Berghem (NL); Wilhelmus Johannes Everardus Maria Van Den Dungen, Veghel (NL); Johannes Martinus Meulendijks, Deurne (NL); Frank Johannes Antonius Van Den Heuij, Gennep (NL); Henk Robert Hoogenkamp, Nijmegen (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 691 days.

(21) Appl. No.: 14/916,341

(22) PCT Filed: Sep. 4, 2014

(86) PCT No.: PCT/NL2014/050603
§ 371 (c)(1),
(2) Date: Mar. 3, 2016

(87) PCT Pub. No.: WO2015/034355
PCT Pub. Date: Mar. 12, 2015

(65) Prior Publication Data
US 2016/0227793 A1 Aug. 11, 2016
US 2017/0071220 A9 Mar. 16, 2017

(30) Foreign Application Priority Data

Sep. 4, 2013 (NL) .................................... 2011382

(51) Int. Cl.
*A22C 13/00* (2006.01)
*B29C 48/10* (2019.01)
(Continued)

(52) U.S. Cl.
CPC ...... *A22C 13/0006* (2013.01); *A22C 13/0016* (2013.01); *A23L 13/62* (2016.08);
(Continued)

(58) Field of Classification Search
CPC . A22C 13/0006; A22C 13/0016; A23L 13/65; A23L 13/62; B29C 47/0026; A23V 2002/00; B29K 2089/00
See application file for complete search history.

(56) References Cited

U.S. PATENT DOCUMENTS 3,122,788 A * 3/1964 Lieberman ......... A22O 13/0006
264/108
3,535,125 A * 10/1970 Fagan ................ A22O 13/0006
264/209.1

(Continued)

FOREIGN PATENT DOCUMENTS

EP 0183153 A1 * 6/1986 ............. A22C 13/00
GB 1166398 A 10/1969

OTHER PUBLICATIONS

English Translation EP0183153; Winkler, Bruno et al.; Nov. 23, 1984; Google patents; pp. 1-10 downloaded Jan. 7, 2019.*

*Primary Examiner* — Steven N Leff
(74) *Attorney, Agent, or Firm* — Workman Nydegger

(57) ABSTRACT

The invention relates to a method of extruding sleeves extruded of collagen for encasing sausages, wherein a collagen fluid is fed to an extrusion head; the collagen fluid is guided through the extrusion head; and the collagen fluid is discharged from the extrusion head. The invention also relates to an extrusion head for performing such a process as well as a co-extrusion sausage line. Finally also the sleeve extruded with this method or devices is part of the invention.

7 Claims, 3 Drawing Sheets

(51) Int. Cl.
*A23L 13/60* (2016.01)
*B29L 23/00* (2006.01)

(52) U.S. Cl.
CPC .............. *A23L 13/65* (2016.08); *B29C 48/10* (2019.02); *A22C 2013/0023* (2013.01); *A23V 2002/00* (2013.01); *B29K 2089/00* (2013.01); *B29L 2023/002* (2013.01)

(56) References Cited

U.S. PATENT DOCUMENTS

| | | | |
|---|---|---|---|
| 3,622,353 A | | 11/1971 | Bradshaw et al. |
| 4,060,361 A | * | 11/1977 | Ziolko ............... A22O 13/0006 425/131.1 |
| 4,138,503 A | | 2/1979 | Ziolko |
| 4,450,131 A | * | 5/1984 | Martinek ............ B29O 47/225 264/108 |
| 4,615,889 A | * | 10/1986 | Fu Lu ................. A22O 13/0016 426/140 |
| 5,622,740 A | * | 4/1997 | Miller ................ A22O 13/0013 426/105 |
| 5,670,185 A | * | 9/1997 | Heck ........................ A21O 3/04 425/133.1 |
| 5,759,602 A | | 6/1998 | Kobussen |
| 6,089,845 A | * | 7/2000 | Morgan ............. A22O 13/0016 425/133.1 |
| 6,331,104 B1 | * | 12/2001 | Kobussen .......... A22O 13/0006 425/133.1 |
| 2009/0162502 A1 | * | 6/2009 | Bueker ............. A22O 13/0013 426/140 |

* cited by examiner

METHOD OF EXTRUDING SAUSAGE SLEEVES OF AT LEAST PARTIAL COLLAGEN, EXTRUSION HEAD AND EXTRUDED COLLAGEN SLEEVES

CROSS-REFERENCE TO RELATED APPLICATIONS

This application is a National Phase Application of PCT International Application No. PCT/NL2014/050603, International Filing Date, Sep. 4, 2014, claiming priority to Netherlands Patent Application No. 2011382, filed Sep. 4, 2013, each of which is hereby incorporated by reference in its entirety.

BACKGROUND OF THE INVENTION

The present invention relates to a method of extruding sleeves extruded of collagen or a collagen comprising mixture for encasing sausages, comprising the successive method steps: A) feeding a collagen fluid to an extrusion head; B) guiding the collagen fluid through the extrusion head; and C) discharging the collagen fluid from the extrusion head, wherein during processing step B) the collagen fluid is transported between two rotatable and co-operating jackets which co-operating jackets are rotated in opposite directions. The present invention also relates to an extrusion head for at least partial collagen edible sleeves for encasing sausages, comprising: a collagen fluid feed; a collagen fluid guide connecting to the collagen fluid feed having an internal and an external guide jacket; and a collagen fluid discharge connecting to the collagen fluid guide. The present invention also relates to a co-extrusion sausage line, for the extrusion of an at least partial collagen edible sleeve around an extruded food dough string as well as to a sleeve extruded of collagen or a collagen comprising mixture produced with such an extrusion method, such an extrusion head and/or such an co-extrusion sausage line.

Edible casings for sausages are either made from the sub-mucosal layer of animal intestines or are manufactured from collagen fibres using extrusion technology. The collagen used as a extrusion material in the food industry to provide an edible casing can surround various types of food material. In this context extrusion is the process of shaping a product by forcing a material through a die. The collagen used for such extrusion is normally re-generated collagen e.g. from bovine or porcine skin. The specific utilization of collagen according the present invention is as edible encasing material for sausage products, both in a pure composition of the collagen as in a composition in which the collagen is mixed with other (edible) products. Collagen has a fibrous nature and due to the extrusion of the collagen the collagens fibres in the extruded sleeves have the tendency to align in line with the axis of extrusion unless it is mixed or stirred immediately before the extrusion takes place. To produce collagen casings with defined fibre alignment different types of extruders are available which can produce a "crisscross" collagen fibre orientation in the casing using rotating forces. Modern extruders apply these forces using either one rotating jacket or independently counter-rotating jackets to influence collagen alignment.

The Dutch patent application NL 6 909 339, which is a family member of U.S. Pat. No. 3,622,353, discloses the preparation of collagen-coated sausages. During the production process the collagen is extruded in tubular form upon the foodstuff. By using a counter-rotating die friction forces are applied to the collagen fibres that are extruded which is believed to lead to the orientation of the collagen fibres in such a way that the strength of the collagen coating or casing is satisfactory in all directions. To realise the required orientation of the collagen fibres this document prescribes the rotation of the jackets of the extruder with 60 to 120 r.p.m. (rotations per minute) when using dual (counter) rotating jackets. Only when one jacket is rotated the rotation speed should be higher, 120 to 240 r.p.m. to give the same relative speed between the rotating and the non-rotating jacket.

The object of the invention is to provide a method and the equipment to improve the quality control of the properties of sleeves extruded of collagen or a collagen comprising mixture of the type as stated in the introduction.

SUMMARY OF THE INVENTION

The present invention provides a method of extruding sleeves of collagen or a collagen comprising mixture according the preamble wherein the counter rotating jackets are rotated each with a rotation speed of 150-300 r.p.m. Due to the two rotatable and co-operating jackets the collagen (or the collagen comprising mixture) is handled such that the orientation of the fibrous collagen is influenced on a controlled way. The fibre architecture of collagen sleeves prepared from collagen fibres is influenced due to shear force applied by the rotating jackets on the collagen as is also disclosed in the prior art. In the invention, it is recognized that the orientation of the fibrous collagen (which is at least a substantial component of a collagen comprising mixture) substantially influences the tissue structure of the extruded collagen sleeves (e.g. the extra-cellular matrix (ECM) morphology) which influences various mechanical properties (like strength and elasticity). The present invention teaches using higher rotation speeds than the ranges described in the prior art (60-120 r.p.m. for each of the counter rotating jackets) will have a substantial effect on the mechanical properties of the extruded sleeves although the collagen fibre directions appear to be similar with the collagen fibre directions in jackets extruded according the prior art. Using the higher rotation speeds (of 150-300 r.p.m. for each of the counter rotating jackets) results in more rigid (higher tensile strength) and less elastic (Young's Modulus) coatings/sleeves. Surface response modelling of the Young's Modulus, shows that films made at both lower inner and outer jacket speeds are more elastic. Although the higher jacket rotation speeds do not have any substantial influence anymore on the fibre orientation compared to the lower jacket rotation speeds according the prior art (the general collagen fibre direction appear to be similar), the higher rotation speeds according the present invention have an influence on the mechanical properties due to (less visible and until now for this purpose not recognised) properties of connection and/or intertwining of the collagen fibre structures as the direction of the fibres cannot account for this phenomenon. These findings concur, as rigidity and elasticity are principally adverse material properties. The collagen fibres exposed to more shear force could be less randomly coiled in its tertiary state. The difference in shear force exerted on the collagen could be stored in the form of tension between the collagen structures, ergo, resulting in a more rigid construct. Further testing revealed that rotation speeds above the present claimed range (so above 300 r.p.m. or above 250 r.p.m. with counter rotating jackets) result in slightly weaker sleeves. A further advantage of the claimed jacket rotation speeds is that the number and volume of lumps of collagen fibres in the extruded collagen sleeves will be limited. More specific favourable ranges for the rotation speed of the counter rotating jackets are 150-250 r.p.m. or even 150-200 r.p.m., as in the higher part of the range the surprising additional effect on the mechanical properties of the sleeve is less pronounced. But other favourable ranges for the rotation speed of the counter rotating jackets are 200-300 r.p.m. or 200-250 r.p.m. as in the ranges the surprising additional effect on the mechanical properties of the sleeve is not yet fully reached. In claiming the ranges the limiting values (so the mentioned range borders may be included or excluded from the range (as mathematical depicted; [ ], [>,<[ or < >). The rotational speed, together with the roughness of the jacket surfaces contacting the collagen as well as the composition and structure of the collagen itself, influences the end result (thickness, strength and other qualities of the sleeves).

Furthermore influencing the tissue structure of the extruded collagen sleeves will normally also have it's effect on the cell behaviour in the sleeves. Also the in- and outside of the sleeves is smooth and not porous. Getting more control on the organization or architecture of the collagen fibres in the sleeves not only provides an additional opportunity to control the mechanical properties but also enables to a certain level "mimicking" the properties of natural intestines that are used as sausage skin so to produce an artificial casing that provides a impression in line with natural casings. Due to using counter-rotating jackets within the claimed rotation speed range the collagen fibre orientation on the outside (the outer layer) of the extruded sleeves and properties of connection and/or intertwining of the collagen fibre structures will be realised by the direction of rotation and the rotation speed of the outer jacket while the inside (the inner layer) of the extruded sleeves will be influenced by the direction and the speed of rotation of the inner jacket. When looking into the structure of the extruded sleeves the influence of the sheer forces applied by the jackets will diminish gradually further away for the inner and outer sleeve surfaces which is shown by the gradual change of the average collagen fibre angle over the sectional plane through the sleeves. More specific testing showed that the fibre direction of collagen films prepared from collagen fibres is influenced using shear force applied by independently counter-rotating jackets. Evaluation of films using SHG microscopy revealed a general trend where the fibres in the top region of the sleeves were oriented in the rotation direction of the outer jacket. This was also true for the fibres in the bottom region, where they were oriented in the rotation direction of the inner jacket. The change in fibre direction seemed to be a gradual change throughout the sections of the sample.

In a specific situation the rotation speed of at least one of the rotating jackets is individually controllable, but it is also possible that the rotation speed of both of the rotating jackets is individually controllable. Testing showed for instance that a higher outer jacket speed resulted in a thicker film and that lower jacket speeds (of both the inner and outer jacket) result in a higher elasticity of the extruded sleeves. The testing also revealed that the inner jacket speed does not contribute to the film thickness in the same magnitude as the outer jacket. Furthermore a difference in rotation speed of the inner and outer jacket makes a difference for which jacket can be seen as "dominant" towards its influence on fibre alignment. The "dominant" jacket is defined as the jacket that has the most effect on the collagen fibre alignment, the collagen connection and/or their intertwinement. The neutral layer of the extruded collagen sleeve (that is the sleeve layer where the collagens fibres are not placed in an angle that corresponds with one or the sleeve rotation directions) can be moved in the sleeve by changing the rotation speed relation between the two rotatable jackets. Thus changing the rotation speed of at least one of the jackets may result in the change in the sleeve properties.

It is also possible to extrude a food dough from the inside of the co-operating jackets (thus from the inside of the inner jacket) simultaneously with the extrusion of the collagen fluid and. Such extrusion process is also referred to as a co-extrusion process. The advantage is here that the extruded sleeve may directly applied on a food dough core (in sausage production often a core of meat dough).

As an alternative it is also possible to apply the collagen fluid when being discharged onto a core (or mandrel). After at least partial setting (hardening) of the sleeve on the core the sleeve may than be loosened from the mandrel to be used in a subsequent sausage stuffing process.

At least one of the collagen fluid guiding jackets may be interchanged for an alternative collagen fluid guiding jacket, which interchangeable jackets have contact surfaces to the collagen with different properties. By changing the jackets the contact surface of the inner and/or outer jacket may be changed while the different contact surfaces will also have a different effect on the collagen fluid flowing along the surfaces. For instance the surface structure and roughness may have it's effect on the shear forces transferred. Also one or both of the interchangeable jackets may be provided with a flow guiding profile with raised and lowered jacket surface parts thus having it's effect on the collagen fluid flow and the resulting collagen sleeves.

Yet in a further embodiment the collagen fluid may be cooled in the extrusion head. Due to the (enhanced) friction between the jackets and the collagen fluid the collagen fluid may warm up during the transport of the collagen fluid through the extrusion head. Now to prevent the collagen fluid to react (e.g. partially already partially set) at a level that will negatively influence the extrusion of the collagen fluid from the extrusion head the collagen fluid may be cooled in the extrusion head.

The invention also provides an extrusion head for sleeves of collagen or a collagen comprising mixture for encasing sausages, comprising: a collagen fluid feed aperture; a collagen fluid guide connecting to the collagen fluid feed aperture having an internal and an external guide jacket; a collagen fluid discharge connecting to the collagen fluid guide; and at least one drive for rotating the internal and external guide jackets in opposite directions with a rotation speed of 150-300 rpm. With such an extrusion head the advantages as mentioned above in relation to the method according the present invention may be realised. Here in relation to the extrusion head these advantages are included by reference. Furthermore the alternative claimed rotation speed ranges (150-250 r.p.m., 150-200 r.p.m., 200-300 r.p.m., and 200-250 r.p.m.) are claimed by reference. Thus a partially controlled orientation and structure of the fibrous collagen in the extruded sleeves may be realised with the extrusion head according the present invention leading to known and controlled sleeve properties. The extrusion head according the invention may have a compact size and may also be simple to construct and to operate.

In a specific embodiment of the extrusion head the drive for rotating the internal and external guide jackets may be integrated in the extrusion head. As an alternative it is also possible to locate the drive for rotating the internal and external guide jackets outside the extrusion head.

In another embodiment the guide jackets may be an exchangeable part of the extrusion head. This not only provides the opportunity to change the surface quality of at least one of the jackets (e.g. with at least one of the jackets having profiled surface, see text above in relation to the method) but may also be used for maintenance and repair purposes.

Positive test results occurred with at least one of the guide jackets being circle-cylindrical shaped. Such circle-cylindrical jackets are also referred to as "cones".

For co-extrusion of, combine, a core of food dough and a collagen coating thereon it inside the rotatable jackets a food dough extrusion passage may be provided. In another embodiment the extrusion head is provided with a cooling for the collagen fluid to prevent collagen gel to warm up so that the collagen fluid characteristic change to much before extrusion form the extrusion head.

A to automatically control the characteristics of the extruded collagen sleeve the extrusion head may be provided with a control system that enables to modify rotation speed of at least one of the guide jackets.

The invention also provides a co-extrusion sausage line, for the co-extrusion of edible sleeves of collagen (or a collagen comprising mixture) around an extruded food dough string, comprising: an extrusion head according the present invention as stated above; a food dough feed connecting to the food dough extrusion passage of the extrusion head; a collagen fluid feed connecting to the collagen fluid feed aperture; and a transporter connecting to the extrusion head for the discharge of the co-extruded food string. With such a co-extrusion sausage line collagen coated sausages may be produced a high volume with quality controlled casing.

The invention also provides an extruded collagen sleeve produced with an extrusion method according the invention and/or with an extrusion head according the present invention. The sleeves may also be produced without stuffing so to be used in a subsequent processing step. As an alternative the extruded collagen sleeve may also be extruded together with the sleeve extrusion so to provide a sausage having an extruded collagen sleeve according the present invention that is produced on a co-extrusion sausage line also according the present invention.

BRIEF DESCRIPTION OF THE DRAWINGS

The present invention is further elucidated on the basis of the non-limitative exemplary embodiment shown in the following figures. Herein shows.

DETAILED DESCRIPTION OF THE PREFERRED EMBODIMENTS

Figure 1A:
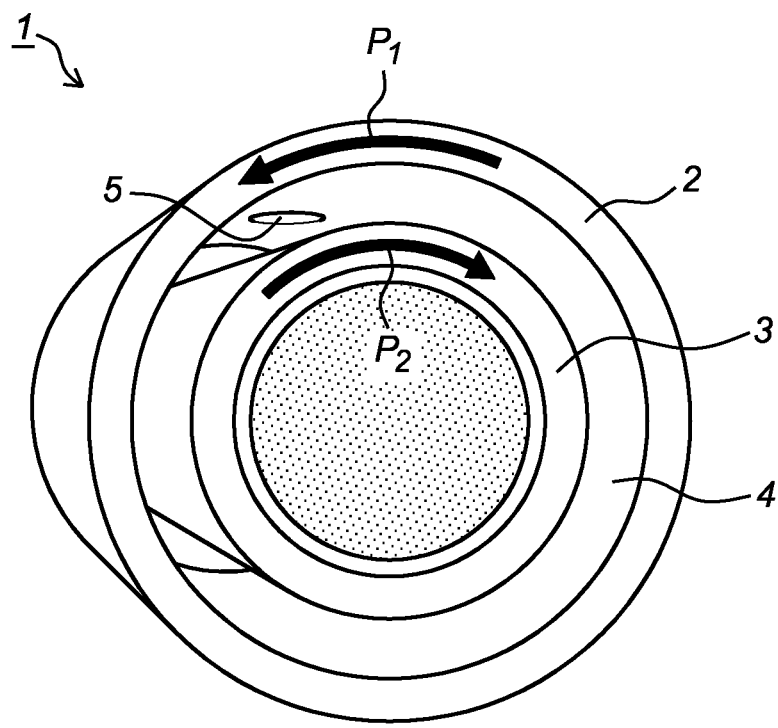
FIG. 1A a perspective view on a schematic represented extrusion head according the present invention in an empty situation.

FIG. 1A shows a schematic represented extrusion head 1 with independently counter-rotating jackets 2, 3 (for direction of rotation see $P_1$, $P_2$). A collagen fluid to be extruded form the extrusion head 1 travels from a pump (not shown here) through the rotating extrusion head 1, in-between the jacket 2, 3 and is eventually extruded through a circular slit 4 (e.g. with an aperture in the order of 250-400 μm). For feeding the collagen fluid to the extrusion head apertures 5 in the outer jacket 2 are provided of which only one is visible in this figure.

Figure 1B:
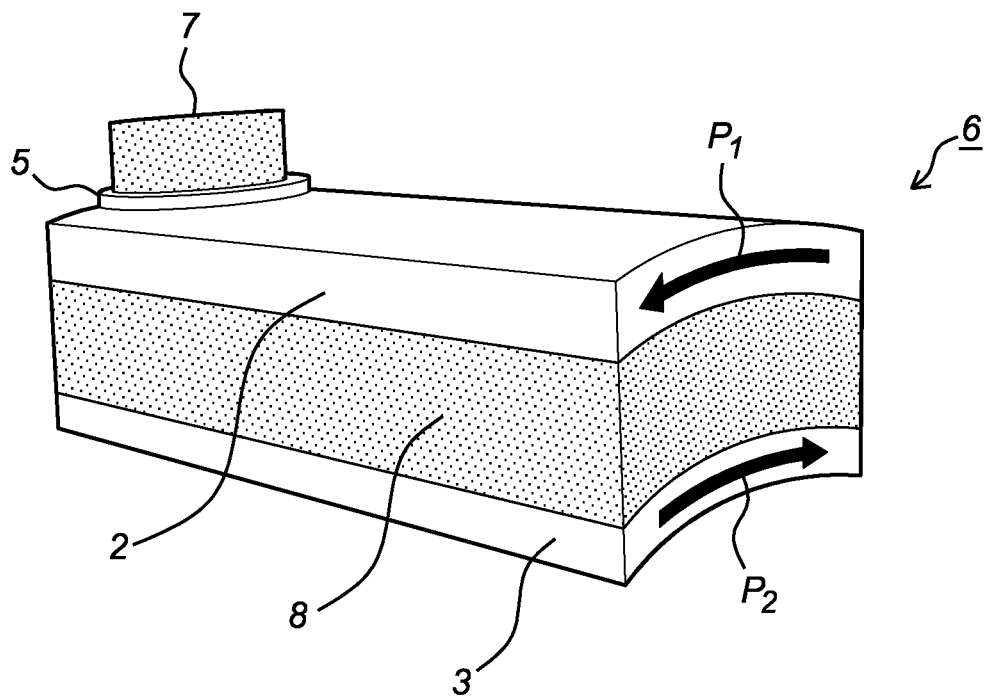
FIG. 1B a perspective view on a segment of schematic represented extrusion head as shown in FIG. 1A in a collagen filled situation.

FIG. 1B shows a perspective view on a segment 6 of the extrusion head 1 of FIG. 1A in which a collagen fluid 7 is inserter via the aperture 5 in the outer jacket 2 in between the counter-rotating jackets 2, 3 so that in two opposite directions ($P_1$, $P_2$) shear forces are exerted on a collagen film 8 that flows though the extrusion head 1.

Figure 2A:
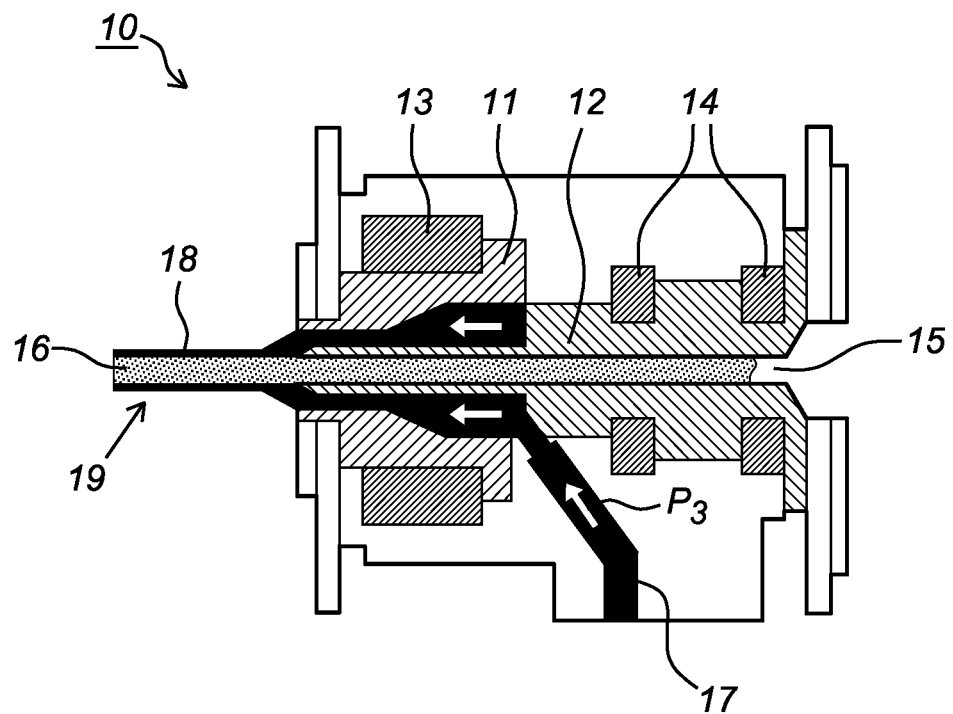
FIG. 2A a view on a cross section through a more detailed but still schematic extrusion head according the present invention.

FIG. 2A shows another embodiment of an extrusion head 10 according the present invention having an out jacket 11 and an inner jacket 12 that are counter-rotatable (see bearings 13, 14). Via a central feed 15 a food dough is extruded as a food dough core 16 and via a collagen fluid feed 17 a collagen fluid is fed (see $P_3$) is fed in between the counter-rotating jackets 11, 12 so as to form a casing 18 of the co-extruded sausage 19.

Figure 2B:
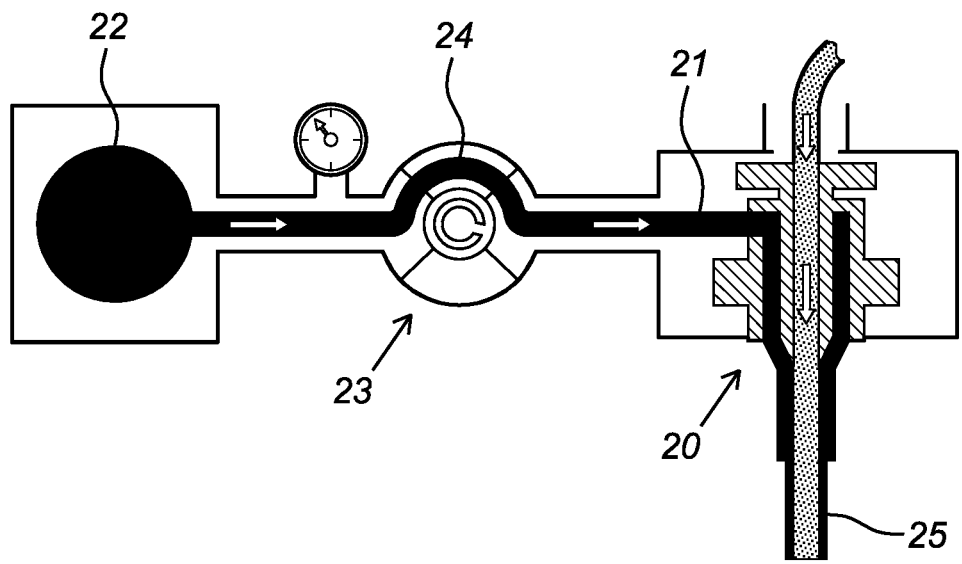
FIG. 2B a view on a cross section through a schematic extrusion head according the present invention including a collagen fluid feed system.

FIG. 2B shows a co-extrusion head 20 according the present invention including a collagen fluid feed 21. Collagen fluid 22 may before the extrusion takes place be mixed at a low temperature (e.g. 4° C.) for some period of time (e.g. 30 minutes) and subsequently be loaded into an extrusion system 23 which applies a constant collagen pressure (e.g. 5 bar) to a metering pump 24 (e.g. set at 55 rpm). The collagen fluid 22 travels from the pump 23 through the counter-rotating extrusion head 20 and is eventually extruded. A resulting collagen sleeve 25 (e.g. with a thickness between 160-220 μm) may after extrusion be placed in a brine solution (e.g. 6M NaCl) to set (not shown here).

Figure 3:
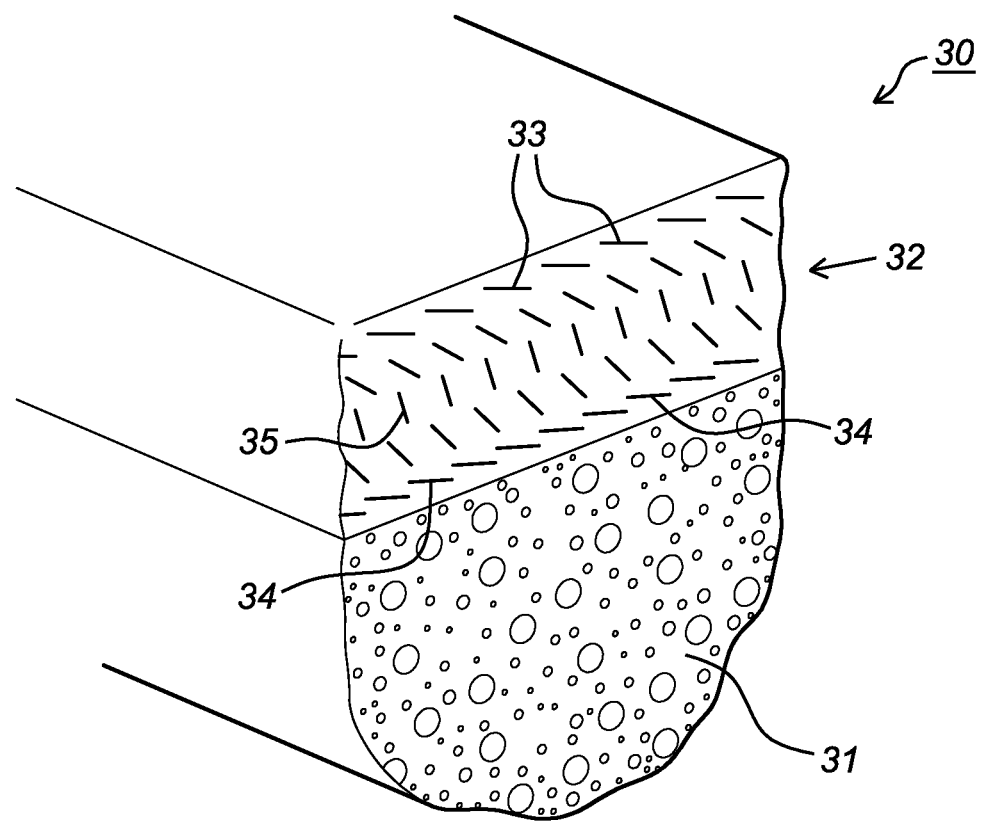
FIG. 3 a part of a sausage co-extruded according the present invention.

FIG. 3 shows a part 30 of a sausage co-extruded according the present invention. The core 31 of the sausage 30 is made out of food dough (e.g.—but not exclusive—meat dough). On the meat dough core 31 is a casing (sleeve) 32 of collagen fluid (gel) extruded. In the casing 32 various fibre (e.g.—but not exclusive—collagen fibres) are embedded. The fibres 33 on the outside of the casing 31 (e.g. with fibre directions ranging from of 15° to 45°) are oriented in a different direction than the fibres 34 on the inside of the casing 31 being close to the meat dough core 31 (e.g. with fibre directions ranging from of −10° to −35°). The direction of the fibres 33 on the outside of the casing 31 gradually changes over the thickness of the sleeve 32. Somewhere in the middle of the casing 31 the fibres 35 will be oriented neutrally (fibre direction of 0°), so in between the two extreme orientation directions of the fibres 33 and 34). The properties of the resulting sleeve 32 (and more specific the positioning (alignment) of the collagen fibres 33, 34, 35 in the sleeve 32) are among others dependent on a plurality of variable like for instance; the amount of mixing of a collagen fluid, the type of mixing, the collagen fluid characteristics, the collagen fibre lengths, the rotation speeds of the counter rotating jackets, the relative difference of jacket rotation speeds, the shape and structure of the contact surfaces of the rotating jackets. For the characterization of the extruded sleeves a combination of scanning electron and multi-photon microscopy with subsequent image analysis may be used. For determining the mechanical characterization and the degree of fibre alignment use may be made of e.g. multi-photon microscopy, image analysis, confocal microscopy, angle-sensitive magnetic resonance imaging, small angle light scattering, quantitative polarized light microscopy, nonlinear optical microscopic imaging and multi-photon microscopy.

What is claimed:

1. Method of extruding sleeves of collagen or a collagen comprising mixture for encasing sausages, comprising the successive method steps:
   A) feeding a collagen fluid to an extrusion head;
   B) guiding the collagen fluid through the extrusion head;
   C) cooling the collagen fluid during processing step B); and
   D) discharging the collagen fluid from the extrusion head;
   wherein during processing step B) the collagen fluid is transported between two rotatable and co-operating jackets defining an internal jacket and an external jacket and which co-operating jackets are rotated in opposite directions, characterized in that the counter rotating jackets are rotated each with a rotation speed of 150-300 rpm relative to the extrusion head;
   wherein the internal and external jackets define a circular slit therebetween extending a distance from about 250 micrometers to about 400 micrometers.

2. Method according to claim 1, characterized in that the rotation speed of at least one of the rotating jackets is individually controllable.

3. Method according to claim 1, characterized in that simultaneous with the extrusion of the collagen fluid and from the inside of the co-operating jackets a food dough is extruded and the collagen fluid when being discharged is applied onto the extruded food dough.

4. Method according to claim 1, characterized in that the collagen fluid when being discharged is applied onto a core.

5. Method according to claim 1, characterized in that at least one of the collagen fluid guiding jackets is interchanged for an alternative collagen fluid guiding jacket, which interchanged jackets have contact surfaces to the collagen with different properties.

6. Method of extruding sleeves of collagen or a collagen comprising mixture for encasing sausages, comprising the successive method steps:
   A) feeding a collagen fluid to an extrusion head;
   B) guiding the collagen fluid through the extrusion head; and
   C) discharging the collagen fluid from the extrusion head;
   wherein during processing step B) the collagen fluid is transported between two rotatable and co-operating jackets defining an internal jacket and an external jacket and which co-operating jackets are rotated in opposite directions, characterized in that the counter rotating jackets are rotated each with a rotation speed of 150-300 rpm relative to the extrusion head;
   wherein the collagen fluid prior to step A) is mixed at about 4° C.;
   wherein the internal and external jackets define a circular slit therebetween extending a distance from about 250 micrometers to about 400 micrometers.

7. The method according to claim 6, wherein the collagen fluid is mixed for at least 30 minutes prior to step A).

* * * * *